(No Model.)
H. H. E. BERY.
WHIFFLETREE.
No. 294,356. Patented Mar. 4, 1884.
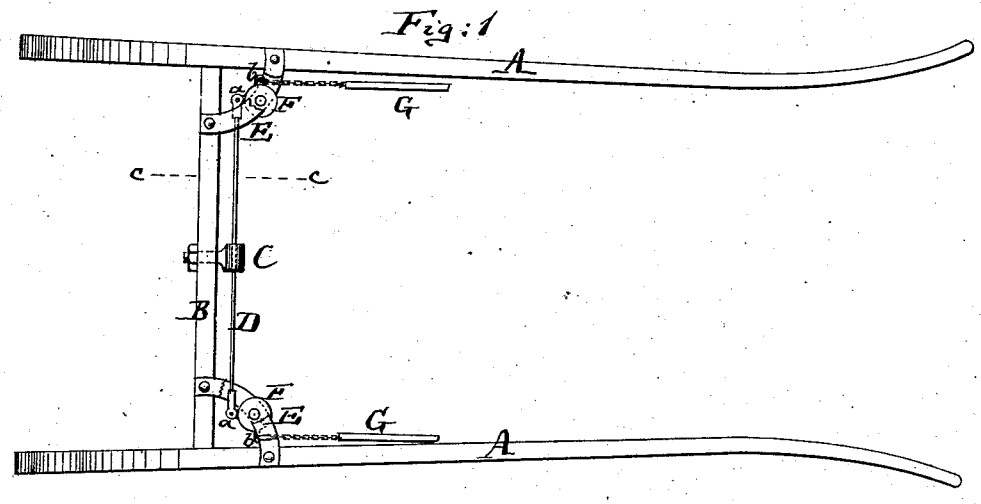
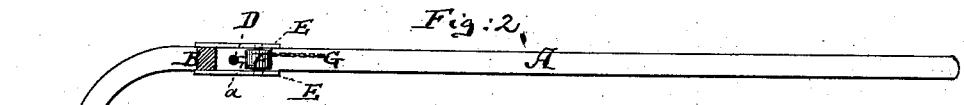
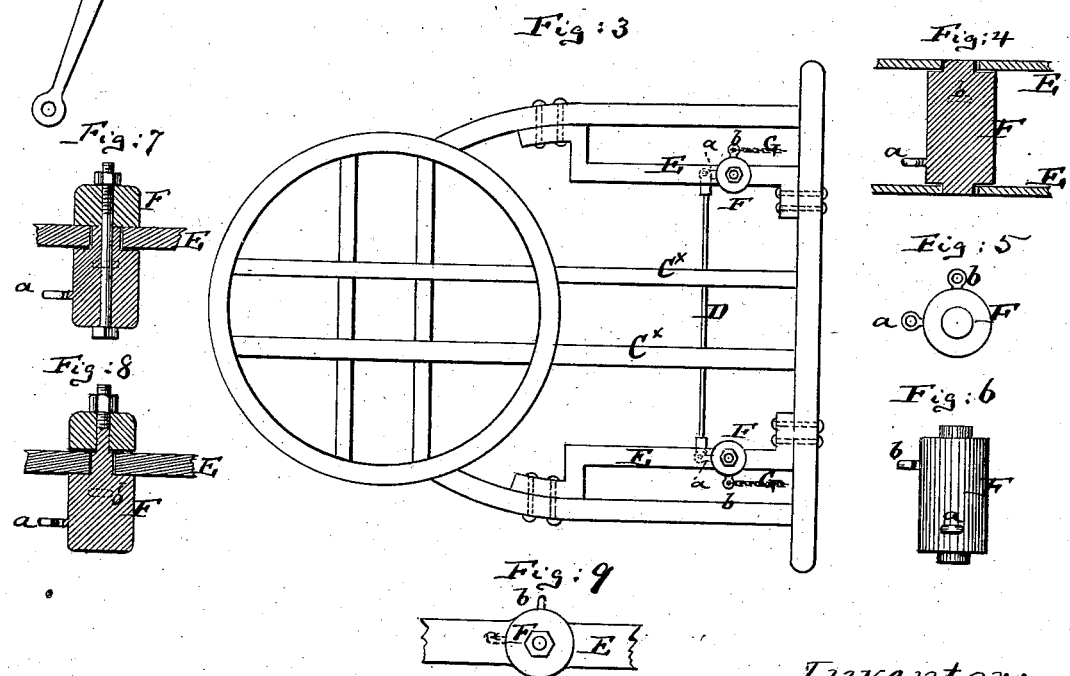
Witnesses:
John C. Tunbridge
John M. Speer
Inventor:
Hans H. E. Bery
by his attorneys
Briesen & Steele

UNITED STATES PATENT OFFICE.

HANS H. E. BERY, OF BROOKLYN, NEW YORK.

WHIFFLETREE.

SPECIFICATION forming part of Letters Patent No. 294,356, dated March 4, 1884.

Application filed December 18, 1883. (No model.)

*To all whom it may concern:*

Be it known that I, HANS H. E. BERY, a resident of Brooklyn, in the county of Kings and State of New York, have invented an Improved Whiffletree, of which the following is a full, clear, and exact description, reference being made to the accompanying drawings, in which—

Figure 1 is a plan or top view of my improved whiffletree. Fig. 2 is a cross-section of the same on the line $c\ c$, Fig. 1. Fig. 3 is a plan view of a modification of the same. Figs. 4, 5, and 6 are detailed views on an enlarged scale of parts shown in Fig. 1. Figs. 7, 8, and 9 are detailed views on an enlarged scale of parts shown in Fig. 3.

This invention has for its object to produce a balancing-whiffletree for wagons, trucks, and other vehicles, that shall be so arranged that if a greater strain is put on one end than on the other, such strain will be equalized by the construction of the mechanism which I am about to describe.

The invention consists, principally, in combining the springy whiffletree with pivoted blocks that are hung in separate braces on the framing of the vehicle, and with projections on said pivoted blocks, to which the traces or single-trees are connected.

In Fig. 1 of the drawings, letters A A represent the shafts of a one-horse vehicle, B being a cross-bar between them. C is a tube or hollow socket fastened to the center of the cross-bar B, and being adapted to receive the springy whiffletree D, that passes lengthwise through it, and which whiffletree is capable of sliding in said tube or socket C and of bending in the middle under strain. E E are angle-braces which connect the cross-bar B with the shafts A, as shown, there being two such angle-braces in each corner, one above the other, as indicated in Fig. 4—at least preferably so. In each of these sets of cross-braces is pivoted a block, F, which is capable of turning on its vertical pivots. Figs. 4, 5, and 6 show this block F in enlarged view. The blocks F F have projecting ears $a$ at their rear and projecting ears $b$ at their sides. To the ears $a$ are pivoted the ends of the whiffletree D, while to the ears $b$ are hitched the traces G. Now, when the animal pulls on these traces evenly, the whiffletree will not be disturbed; but if one trace should be drawn harder than the other, the block F on that side will be turned on its pivot, the whiffletree D drawn toward that block, and thereby the other block F turned and the other trace pulled back, thus equalizing the strain, and causing each trace to bear an equal amount thereof. At the same time, when the whiffletree is thus moved lengthwise, its ends will be drawn forward, but its center will not. The strain is therefore partly taken up by the center of the cross-bar B whenever unequal draft is applied, thus relieving the braces E E.

The modification which is shown in Fig. 3 is intended to illustrate the application of my invention to a heavier truck, which may be drawn by two draft-animals. Here the blocks F are shown pivoted in braces E, that pertain to the truck-frame, and to connect, by their backwardly-projecting lugs or ears $a$, with the whiffletree D, while their sidewardly-projecting ears $b$ connect with the chains G. To these chains may either be fastened the single-trees if two horses are employed, or the traces if one horse.

Figs. 7 and 8 show how the blocks F are pivoted in the braces E. In this modification the loop C is not shown, nor is it necessary to employ it, although the sliding whiffletree D can be guided in passages formed for its reception in the parts C of the truck-frame.

I claim—

1. The combination of the shafts A, bar B, and whiffletree D with the swiveled blocks F F, having projecting ears $a\ b$, and with two pairs of braces, E E, between which said blocks are swiveled, all arranged substantially as herein shown and described.

2. The combination of the springy whiffletree D with the guide tube or support C, swiveled blocks F F, having projecting ears $a\ b$, and braces E E, in which said blocks are swiveled, and cross-bar B, all arranged to spring the whiffletree in the middle whenever the draft is unequal at its ends, as set forth.

HANS H. E. BERY.

Witnesses:
JOHN C. TUNBRIDGE,
WILLY G. E. SCHULTZ.